United States Patent
Lee (10) Patent No.: US 7,583,467 B2
(45) Date of Patent: Sep. 1, 2009

(54) HARD DISK DRIVE APPARATUS, METHOD TO CONTROL FLYING ON DEMAND OF HARD DISK DRIVE APPARATUS USING THERMAL ASPERITY SIGNAL, AND RECORDING MEDIA FOR COMPUTER PROGRAM THEREOF

(75) Inventor: Sang Hyub Lee, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/026,767

(22) Filed: Feb. 6, 2008

(65) Prior Publication Data

US 2008/0192377 A1 Aug. 14, 2008

(30) Foreign Application Priority Data

Feb. 12, 2007 (KR) ............... 10-2007-0014529

(51) Int. Cl.
*G11B 21/02* (2006.01)
(52) U.S. Cl. .................................................. 360/75
(58) Field of Classification Search ................ 360/75, 360/31, 59, 294.7, 235.4, 319, 235.2, 234.7, 360/314
See application file for complete search history.

(56) References Cited

U.S. PATENT DOCUMENTS

| | | | | |
|---|---|---|---|---|
| 5,768,055 | A * | 6/1998 | Tian et al. | 360/235.2 |
| 5,991,113 | A * | 11/1999 | Meyer et al. | 360/75 |
| 6,314,814 | B1 * | 11/2001 | Brannon et al. | 73/705 |
| 6,707,646 | B2 * | 3/2004 | Berger et al. | 360/294.7 |
| 6,710,952 | B1 * | 3/2004 | Smith | 360/31 |
| 7,457,069 | B2 * | 11/2008 | Yoshioka et al. | 360/75 |
| 2008/0084628 | A1 * | 4/2008 | Ohta et al. | 360/59 |
| 2008/0094755 | A1 * | 4/2008 | Ota et al. | 360/235.4 |
| 2008/0218909 | A1 * | 9/2008 | Kurihara et al. | 360/319 |
| 2008/0253026 | A1 * | 10/2008 | Mahdev et al. | 360/234.7 |
| 2008/0291579 | A1 * | 11/2008 | Uesugi et al. | 360/314 |

FOREIGN PATENT DOCUMENTS

| | | |
|---|---|---|
| JP | 06-215514 | 8/1994 |
| JP | 6-215514 | 8/1994 |
| KR | 2003-78609 | 10/2003 |
| KR | 2004-0052031 | 6/2004 |
| KR | 2005-21898 | 3/2005 |
| KR | 2006-67318 | 6/2006 |

OTHER PUBLICATIONS

Korean Office Action mailed Mar. 30, 2008 in KR 10-2007-0014529.

* cited by examiner

*Primary Examiner*—Fred Tzeng
(74) *Attorney, Agent, or Firm*—Stanzione & Kim LLP (57) ABSTRACT

A method to control an FOD (flying on demand) voltage of a hard disk drive apparatus using a TA (thermal asperity) signal includes providing at least one protrusion having a predetermined height on a disk, moving a magnetic head to a position of the protrusion, and applying an FOD voltage for a test to the magnetic head, detecting the TA signal generated when the magnetic head touches the protrusion by the applied FOD voltage for a test, and determining the maximum FOD voltage, that is, the maximum FOD voltage applied to the magnetic head, based on the detected TA signal and determining an FOD voltage to control the FH (flying height) of the magnetic head based on the maximum FOD voltage.

17 Claims, 7 Drawing Sheets

HARD DISK DRIVE APPARATUS, METHOD TO CONTROL FLYING ON DEMAND OF HARD DISK DRIVE APPARATUS USING THERMAL ASPERITY SIGNAL, AND RECORDING MEDIA FOR COMPUTER PROGRAM THEREOF

CROSS-REFERENCE TO RELATED APPLICATIONS

This application claims the priority under 35 U.S.C. §119(a) from Korean Patent Application No. 10-2007-0014529, filed on Feb. 12, 2007, in the Korean Intellectual Property Office, the disclosure of which is incorporated herein by reference.

BACKGROUND OF THE INVENTION

1. Field of the Invention

The present general inventive concept relates to a hard disk drive apparatus, a method to control a flying on demand (FOD) of a hard disk drive apparatus using a thermal asperity (TA) signal, and recording media for computer program thereof, and more particularly, to a hard disk drive apparatus which can actively control a flying height (FH) of a magnetic head with respect to a disk so as to improve reliability of a read/write operation and solve general problems such as a head disk interface (HDI) caused as a uniform FOD voltage is applied to the magnetic head as in prior art, a method to control the FOD of a hard disk drive using the TA signal, and recording media for computer program thereof.

2. Description of the Related Art

Hard disk drive apparatuses (HDDs) formed of electronic parts and mechanical parts are memory devices to record and reproduce data by converting digital electric pulses to a magnetic field that is more permanent. The HDDs are widely used as auxiliary memory devices of computer systems because of fast access time to a large amount of data. With the recent increase in TPI (tracks per inch; a density in a radial direction of a disk) and BPI (bits per inch; a density in a rotational direction of a disk), the HDD has achieved a high capacity and its application field has expanded.

As the capacity of the HDD increases, a size of a read/write sensor of a magnetic head decreases and the flying height (FH) of the magnetic head gradually decreases. That is, when a high TPI and a high BPI are realized to manufacture a high capacity HDD, a width of a track decreases. When the track width decreases, the strength of a magnetic field becomes weak. Accordingly, when the FH increases, a detection of a magnetic field is difficult so that operation of the HDD cannot be smooth.

For this reason, methods of effectively reducing a spacing loss between the disk and the magnetic head, that is, reducing the FH of the magnetic head with respect to the disk, are actively being developed as a condition precedent to maximize the read/write performance of the magnetic head.

In order to actively control the FH of the magnetic head with respect to the disk, the FH of the magnetic head can be determined. To determine the FH of the magnetic head, a method of controlling a protrusion of the magnetic head using a heater sensor in a slider is used. This method is the most effective in setting the FH that is required.

In the method, a constant voltage or an FOD voltage is applied to a heater coil included in the magnetic head so that a pole tip that is an end portion of the magnetic head thermally expands during the operation of the HDD. Thus, the FH is determined using a characteristic that the FH of the magnetic head is reduced during the thermal expansion of the pole tip. A series of these techniques are referred to as flying on demand (FOD).

In conventional technology, a gradually increasing FOD voltage is applied to the magnetic head. A voltage when the pole tip of the magnetic head touches down on a flat surface of the disk is measured as the maximum FOD voltage. An appropriate FOD voltage less than the maximum FOD voltage is determined and uniformly applied to the magnetic head.

However, since the FH of the magnetic head is substantially not constant and a degree of expansion of each FOD is different, it is difficult to apply the FOD in the above method. In particular, when the FOD voltage is uniformly applied to the magnetic head, if the FH of the magnetic head is too low, the HDI that causes a physical shock is generated between the magnetic head and the disk during the operation of the HDD can be generated. Conversely, when the FH of the magnetic head is too high or the pole tip does not thermally protrude to a desired degree, it is difficult to obtain a desired clearance or gap between the magnetic head and the disk.

Also, in determining the appropriate FOD voltage, there are a variety of methods to detect how much the gap between the magnetic head and the disk can be decreased when a certain amount of a voltage is applied, or what is the maximum FOD voltage that can be applied. Accordingly, there may be a wide difference due to a rotation speed (rpm) of a spindle motor where the disk is mounted, or outside conditions. However, since its repeatability is not superior, various methods to solve the problem have been suggested. Thus, a method to solve the general problems including the HDI that is generated when a uniform FOD voltage is applied to the magnetic head as in the conventional technology, by controlling the FOD in an improved manner is needed.

SUMMARY OF THE INVENTION

The present general inventive concept provides a hard disk drive apparatus that can actively control the flying height (FH) of a magnetic head with respect to a disk so as to improve reliability of a read/write operation and solve general problems such as an HDI caused as a uniform FOD voltage is applied to the magnetic head as in the prior art, a method to control the FOD of the hard disk drive apparatus using a thermal asperity (TA) signal, and recording media for computer program thereof.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept may be achieved by providing a method to control an FOD (flying on demand) voltage of a hard disk drive apparatus using a TA (thermal asperity) signal including providing at least one protrusion having a predetermined height on a disk, moving a magnetic head to a position of the protrusion, and applying an FOD voltage for a test to the magnetic head, detecting the TA signal generated when the magnetic head touches down the protrusion by the applied FOD voltage for a test, and determining a maximum FOD voltage applied to the magnetic head based on the detected TA signal and determining an FOD voltage to control the FH (flying height) of the magnetic head based on the maximum FOD voltage.

The at least one protrusion may be one protrusion and the height of the protrusion may be lower than the FH of the magnetic head with respect to the disk when the FOD voltage for a test is not applied.

The at least one protrusion may be two protrusions having predetermined different heights at different positions on a surface of the disk.

In the determining of the maximum FOD voltage applied to the magnetic head based on the detected TA signal and the determining of an FOD voltage to control the FH (flying height) of the magnetic head based on the maximum FOD voltage, an FOD voltage applied when the magnetic head touches a first protrusion having a lower height of the two protrusions may be used as a first FOD voltage that corresponds to the maximum FOD voltage to control the FH of the magnetic head, and an FOD voltage applied when the magnetic head touches a second protrusion may be used as a second FOD voltage to control the FH of the magnetic head, and an FOD voltage to control the FH of the magnetic head may be determined based on a relationship between the first and second FOD voltages.

The at least one protrusion may be provided at a remaining area except for a data zone on the surface of the disk.

The at least one protrusion may be a bump protruding from the surface of the disk by a laser process.

The at least one protrusion may be a pad formed on the surface of the disk in a lithography method.

The foregoing and/or other aspects and utilities of the present general inventive concept may also be achieved by providing a computer-readable recording medium having embodied thereon a computer program to execute a method, wherein the method includes providing at least one protrusion having a predetermined height on a disk, moving a magnetic head to a position of the protrusion, and applying an FOD voltage for a test to the magnetic head, detecting a thermal asperity (TA) signal generated when the magnetic head touches the protrusion by the applied FOD voltage for a test and determining the maximum FOD voltage applied to the magnetic head based on the detected TA signal and determining an FOD voltage to control the FH (flying height) of the magnetic head based on the maximum FOD voltage.

The foregoing and/or other aspects and utilities of the present general inventive concept may also be achieved by providing a hard disk drive apparatus including a disk on which at least one protrusion having a predetermined height is provided on a surface thereof, a magnetic head to record data on the disk or to reproduce the recorded data, a controller to control moving the magnetic head to a position of the protrusion, to apply an FOD (flying on demand) voltage for a test to the magnetic head, to detect a TA (thermal asperity) signal generated when the magnetic head touches the protrusion by the applied FOD voltage for a test, to determine the maximum FOD voltage applied to the magnetic head based on the detected TA signal, and to determine an FOD voltage to control the FH (flying height) of the magnetic head based on the maximum FOD voltage.

The at least one protrusion may be one and the height of the protrusion may be lower than the FH of the magnetic head with respect to the disk when the FOD voltage for a test is not applied.

The at least one protrusion may be two protrusions having predetermined different heights at different positions on the surface of the disk.

An FOD voltage applied when the magnetic head touches a first protrusion having a lower height of the two protrusions may be used as a first FOD voltage that corresponds to the maximum FOD voltage to control the FH of the magnetic head, and an FOD voltage applied when the magnetic head touches a second protrusion may be used as a second FOD voltage to control the FH of the magnetic head, and an FOD voltage to control the FH of the magnetic head may be determined based on a relationship between the first and second FOD voltages.

The at least one protrusion may be provided at a remaining area except for a data zone on the surface of the disk.

The at least one protrusion may be a bump protruding from the surface of the disk by a laser process.

The at least one protrusion may be a pad formed on the surface of the disk in a lithography method.

The foregoing and/or other aspects and utilities of the general inventive concept may also be achieved by providing a hard disk drive apparatus, including one or more disks, a magnetic head to record data to or reproduce data from the one or more disks and a controller to actively control a flying height of the magnetic head with respect to a respective disk to increase reliability of at least one of a read operation and a write operation based on a thermal asperity signal.

The foregoing and/or other aspects and utilities of the general inventive concept may also be achieved by providing a hard disk drive apparatus, including one or more disks, a magnetic head to record data to or reproduce data from the one or more disks; and a controller to determine a maximum flying on demand (FOD) voltage applied to the magnetic head based on a thermal asperity signal and a FOD voltage to control a flying height of the magnetic head with respect to a respective disk based on the maximum FOD voltage.

The foregoing and/or other aspects and utilities of the general inventive concept may also be achieved by providing a method of operating a hard disk drive apparatus, the method of including recording data to or reproducing data from one or more disks and actively controlling a flying height of the magnetic head with respect to a respective disk to increase reliability of at least one of a read operation and a write operation based on a thermal asperity signal.

The foregoing and/or other aspects and utilities of the general inventive concept may also be achieved by providing a method to control a flying height of a magnetic head of a disk drive apparatus, the method including recording data to or reproducing data from the one or more disks and determining a maximum flying on demand (FOD) voltage applied to the magnetic head based on a thermal asperity signal and a FOD voltage to control a flying height of the magnetic head with respect to a respective disk based on the maximum FOD voltage.

BRIEF DESCRIPTION OF THE DRAWINGS

The above and/or other aspects and utilities of the present general inventive concept will become apparent and more readily appreciated from the following detailed description, taken in conjunction with the accompanying drawings of which.

DETAILED DESCRIPTION OF THE PREFERRED EMBODIMENTS

Reference will now be made in detail to embodiments of the present general inventive concept, examples of which are illustrated in the accompanying drawings, wherein like reference numerals refer to the like elements throughout. The embodiments are described below in order to explain the present general inventive concept by referring to the figures.

In the present embodiment, a flying height (FH) of a magnetic head with respect to a disk can be actively controlled so that reliability of a read/write operation is improved and general problems such as, for example, a head disk interface (HDI) caused as a uniform flying on demand (FOD) voltage is applied to the magnetic head are solved. The FOD is briefly described below with reference to FIG. 1.

Figure 1:
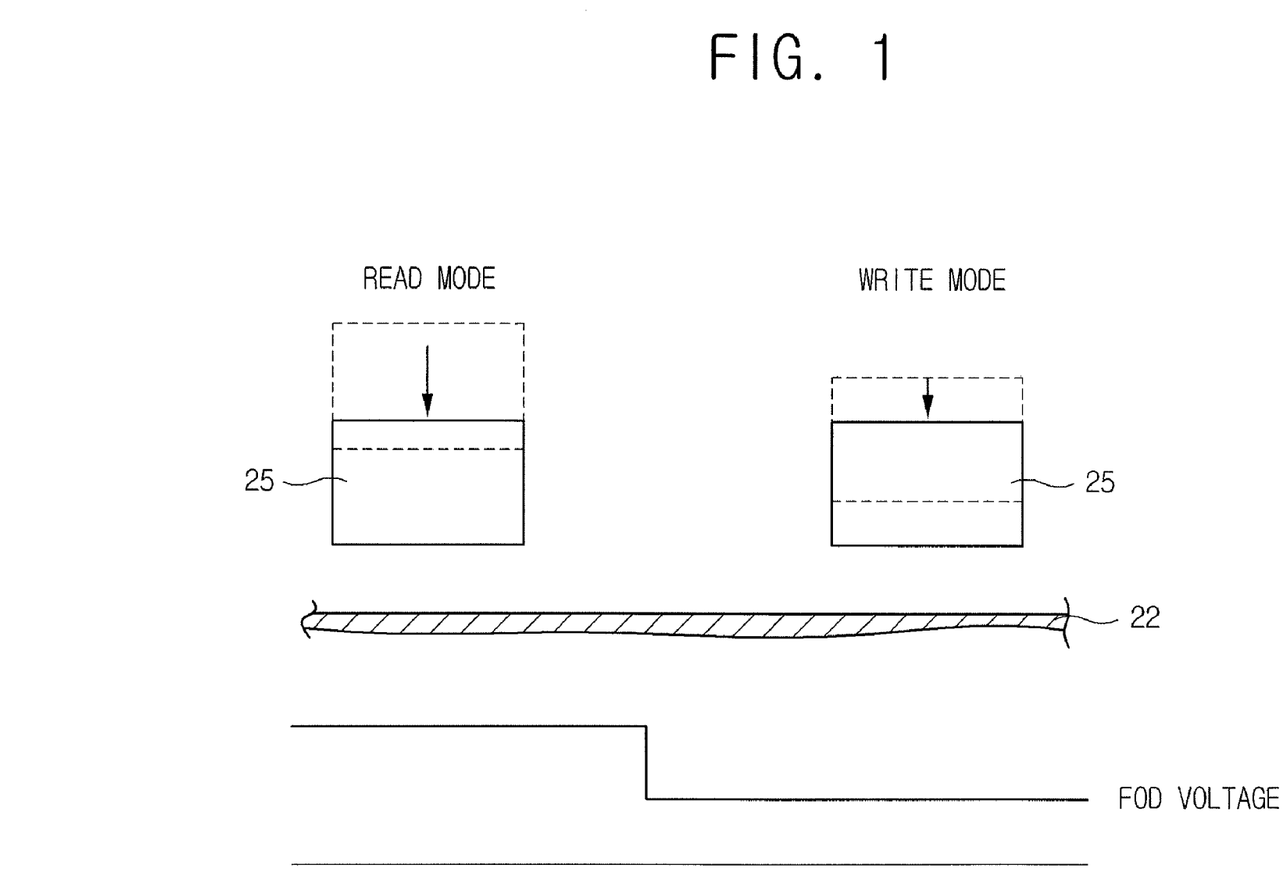
FIG. 1 illustrates a change in a flying height (FH) of a magnetic head with respect to a disk in each of a read mode and a write mode of the magnetic head before and after a flying on demand (FOD) voltage is applied; according to an embodiment of the present general inventive concept.

FIG. 1 illustrates a change in a FH of a magnetic head with respect to a disk in each of a read mode and a write mode of the magnetic head before and after a FOD voltage is applied. As illustrated in FIG. 1, the FOD is a technology using a characteristic that the FH of a magnetic head 25 reduces when a pole tip (not illustrated), that is, an end portion of the magnetic head 25, thermally expands.

For reference, the magnetic head 25 is formed of a metal alloy that is a permalloy formed of nickel Ni and iron Fe as main contents. When current flows through a metal coil of the magnetic head 25 made of a permalloy metal alloy, Joule heat is generated. A portion around the pole tip protrudes due to the Joule heat and a difference in thermal expansion coefficients because of metal contents forming the respective portions of the magnetic head 25. The phenomenon is referred to as a thermal pole tip protrusion (TPTP).

An amount of the TPTP is proportional to i2R where "i" indicates the current flowing in the magnetic head 25 and "R" indicates a resistance of the magnetic head 25. The "R" is a factor determined by a physical property of the magnetic head 25 and fixed as the magnetic head 25 is manufactured. The "i" is a factor determined by a write current (WC) or over shoot current (OSC) used in a hard disk drive apparatus. Since the amount of the TPTP is proportional to the square of the "i", the "i" is a more sensitive factor than the "R".

As illustrated in FIG. 1, when the FOD voltage is applied to the magnetic head 25, the magnetic head 25 moves to a protruding position indicated by a solid line from the original position indicated by a dotted line, due to the pole tip expansion generated by the Joule heat, so that the FH of the magnetic head 25 is lowered. The FOD is to control the FH of the magnetic head 25 using the above principle and technology thereof is being widely studied.

The present embodiment uses the FOD as described above. However, in the present embodiment, a method to control FOD of a hard disk drive apparatus using a thermal asperity (TA) signal is suggested as one of the improved methods compared to the conventional methods. Referring to FIG. 1, the TA signal is briefly described below.

Assuming that the surface of a disk 22 is not substantially flat and defects in a protrusion shape that protrude higher than the FH of the magnetic head 25 exist on the surface of the disk 22, when the magnetic head 25 contacts the protrusion, it is known that a TA signal indicating that a signal from a base signal line changes instantly and drastically is detected. Accordingly, a drive performs an error correction and, when the error correction is not available, a defect processing algorithm is used.

In contrast, when a protrusion protruding from the surface of the disk 22 is substantially very low, that is, lower than the FH of the magnetic head 25, since the protrusion does not contact the magnetic head 25, the TA signal is not detected. However, even when the protrusion is tiny, if an FOD voltage is applied to the magnetic head 25, the FH of the magnetic head 25 decreases so that the protrusion can contact the magnetic head 25. Accordingly, the TA signal is detected.

Consequently, since the TA signal is generated as the protrusion protruding from the surface of the disk 22 contacts the magnetic head 25, in the present embodiment, an FOD control method using a TA signal is provided to determine an appropriate FOD voltage applied to the magnetic head 25 using the TA signal. The FOD control method according to the present embodiment will be described later in detail and a structure of a hard disk drive apparatus will be first described with reference to FIG. 2.

Figure 2:
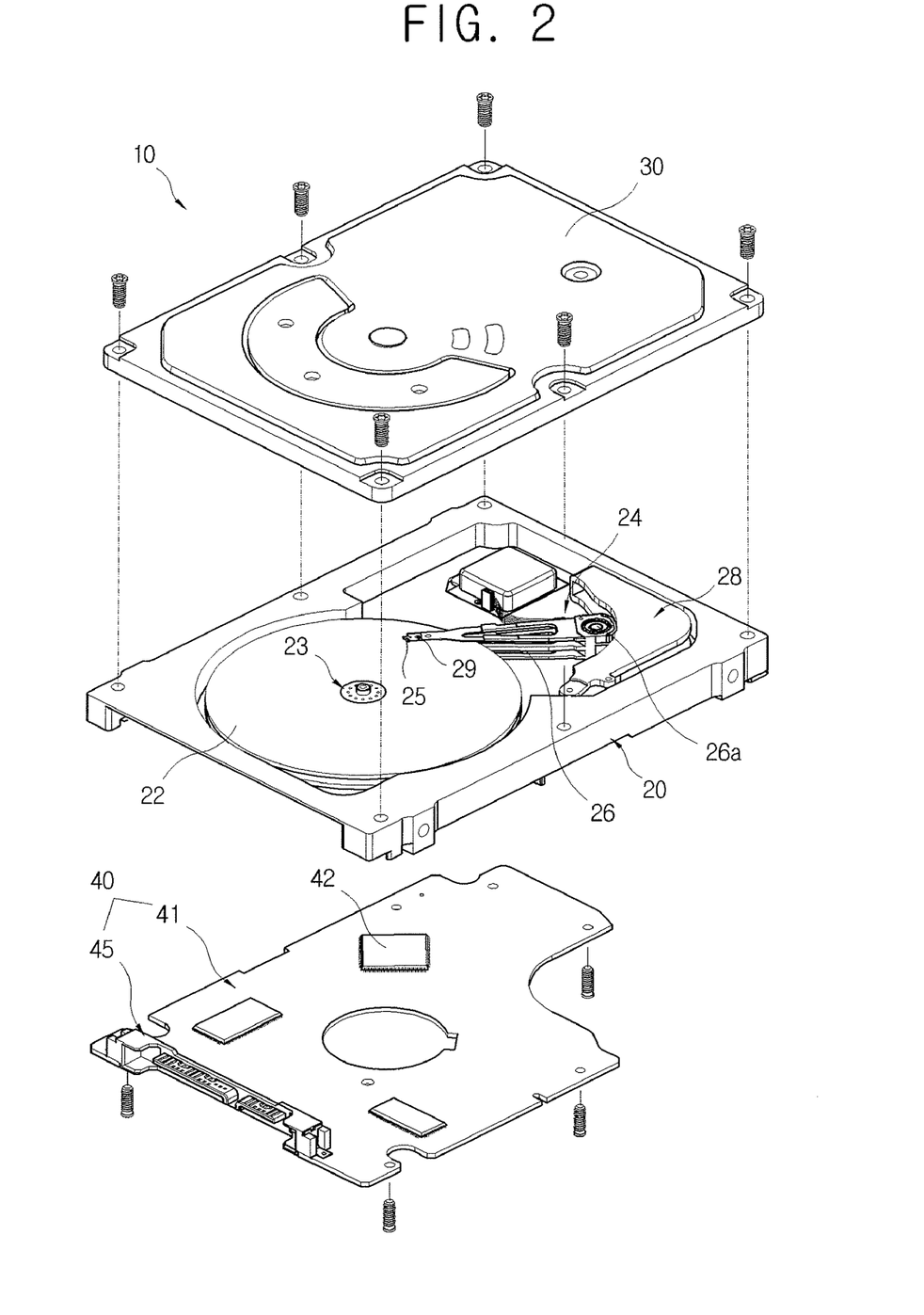
FIG. 2 is an exploded perspective view illustrating a hard disk drive apparatus (HDD) according to an embodiment of the present general inventive concept.

FIG. 2 is an exploded perspective view of a hard disk drive apparatus according to an embodiment of the present general inventive concept. Referring to FIG. 2, a hard disk drive apparatus 10 according to an embodiment of the present general inventive concept includes a base 20, a cover 30 to cover an upper open portion of the base 20, and a printed circuit board assembly (PCBA) 40 coupled to the lower portion of the base 20.

As described later, a plurality of internal parts (not illustrated) related to reading and writing of information are disposed on the base 20. That is, at least one disk 22 recording and storing data, a spindle motor (SPM) 23 provided at a center portion of the disk 22 and rotating the disk 22, and a head stack assembly (HSA) 24 relatively moving toward the disk 22 are disposed on the base 20.

Figure 3:
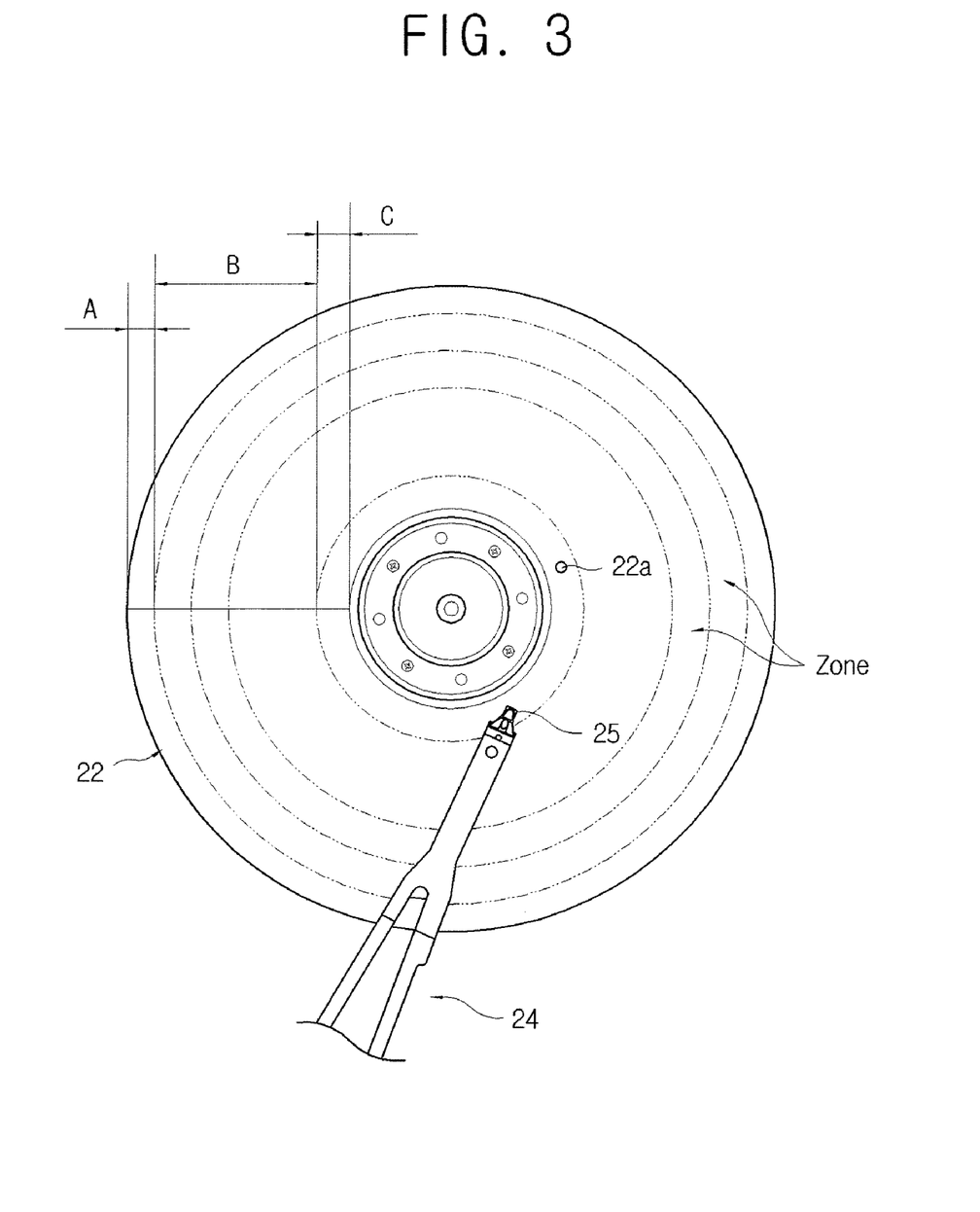
FIG. 3 is an enlarge view of the disk of FIG. 2.
Figure 5:
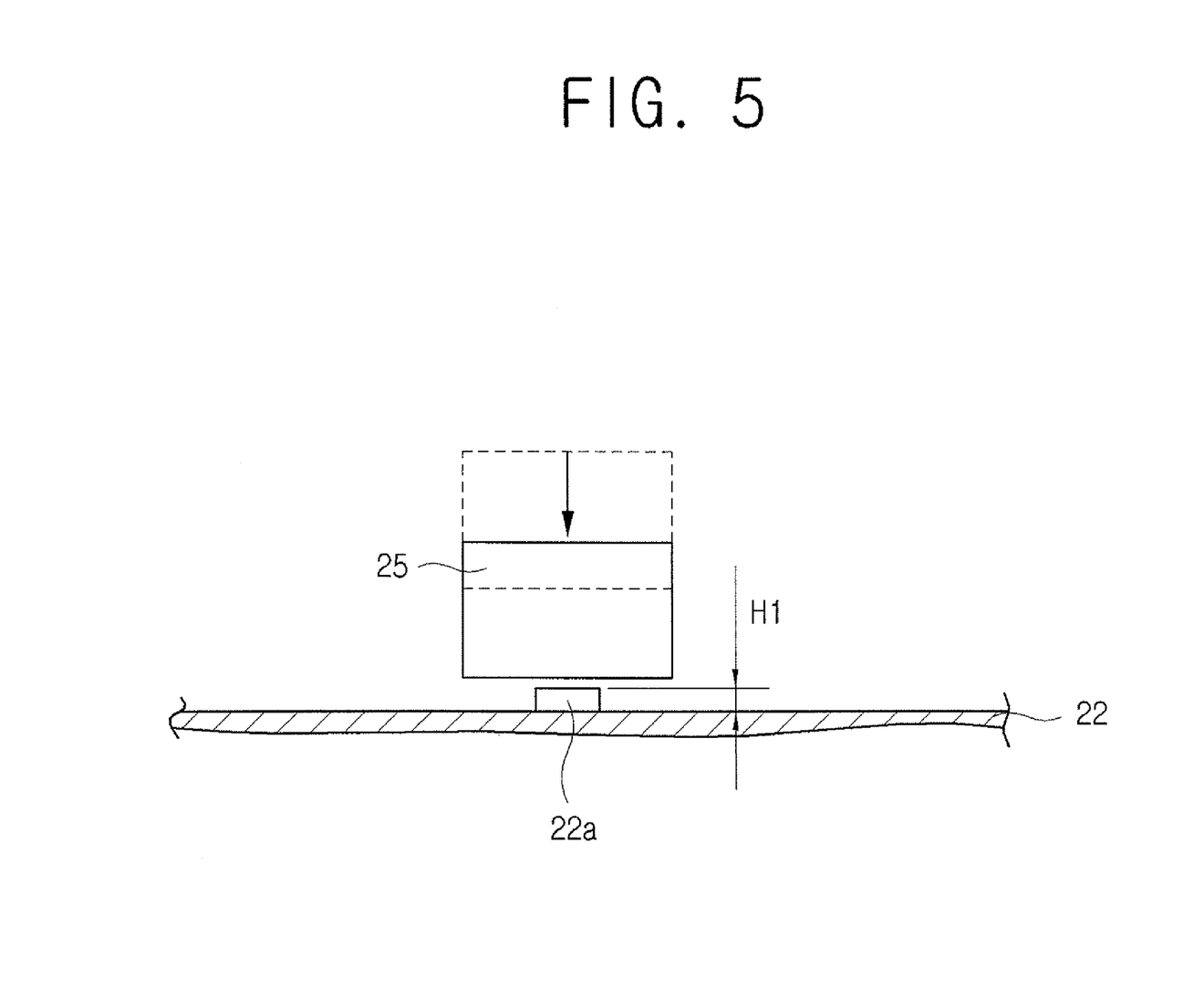
FIG. 5 illustrates a magnetic head proximate to a protrusion of a disk according to an embodiment of the present general inventive concept.

The disk 22 has a shape of a disc and a protrusion 22a as illustrated in FIGS. 3 and 5. The protrusion 22a forms a reference position where the pole tip of the magnetic head 25 thermally expanding and protruding touches the protrusion 22a, to apply the FOD control method using a TA signal. In other words, in the conventional technology, the pole tip thermally expanding and protruding directly touches the surface of the disk 22 that is flat and the FOD is controlled based on a time when the pole tip touches thereon. However, according to the present embodiment, the protrusion 22a is provided and the pole tip of the magnetic head 25 thermally expanding and protruding touches the protrusion 22a so as to control the FOD. The position, height, and manufacturing method of the protrusion 22a will be described later.

The HSA 24 includes the magnetic head 25 to record data on the disk 22 or to reproduce the recorded data and an actuator 26 to make the magnetic head 25 fly so that the magnetic head 25 can access the data on the disk 22. The magnetic head 25 is disposed on a tip end of a head gimbal 29 extending from the actuator 26. The magnetic head 25 is raised by air flow on the surface of the disk 22 as the disk 22 rotates at high speed, and flies while maintaining a fine gap with the surface of the disk 22.

The actuator 26 is capable of rotating around a pivot shaft 26a with respect to the disk 22. That is, as the actuator 26 is moved to the left and right due to an operation of a voice coil motor (VCM) 28 disposed at a side of the actuator 26, the magnetic head 25 disposed at the other side end of the actuator 26 moves across the disk 22 to write data to the track of the disk 22 or read out data from the track (FIG. 2).

Although it is not illustrated in the drawings, a latch (not illustrated) is provided in a lower portion of the VCM 28. The latch elastically supports the actuator 26 to prevent that the actuator 26 is arbitrarily moved when the magnetic head 25 is parked in a parking zone C of the disk 22 (FIG. 2). When a ramp (not illustrated) is separately provided unlike the illustration of the drawings, the magnetic head 25 is parked on the ramp and the parking zone C is excluded from the disk 22.

The PCBA 40 includes a printed circuit board (PCB) 41 where a plurality of circuit parts are mounted and a plug 45 coupled to one side of the PCB 41. A controller 42 to control the hard disk drive apparatus 10 is provided on a surface of the PCB 41. Although it is not illustrated in the drawings, a memory (not illustrated) to store various data or tables is provided around the controller 42.

FIG. 3 is an enlarged view illustrating the disk of FIG. 2. As illustrated in FIG. 3, the disk 22 can be divided into a system zone A, a user data zone B, and a parking zone C. The system zone A is referred to as a maintenance zone where various system information and information for maintenance and repair of the hard disk drive apparatus 10. A general user is not allowed to access the system zone.

The parking zone C is used when the magnetic head 25 is parked on the disk 22. When the power supply to the hard disk drive apparatus 10 is stopped, the magnetic head 25 is parked in the parking zone C, which is referred to as a contact start stop (CSS) method. When the magnetic head 25 is parked on the ramp unlike the illustration of the drawings, the parking zone C is excluded from the disk 22.

The user data zone B existing between the system zone A and the parking zone C is an area where user data is stored. The user data zone B occupies most of the surface of the disk 22. Thus, data is recorded on a track that is concentric and formed in the user data zone B. To facilitate data storing and seek in a regular method, the track of the disk 22 is sectioned into a plurality of blocks that are referred to as sectors. The position information of the sectors is presented by a track or cylinder, the magnetic head 25, and an intrinsic identifier referred to as a sector number. Also, the disk 22 is divided into several sections or zones from an outer circumference to an inner circumference thereof.

The protrusion 22a can be formed in an area except for the user data zone B in the disk 22. That is, the protrusion 22a can be formed in the system zone A or the parking zone C.

As described above, the protrusion 22a forms a reference position where the pole tip of the magnetic head 25 thermally expanding and protruding touches thereon, to apply the FOD control method using a TA signal according to the present embodiment. Thus, the protrusion 22a protrudes from the surface of the disk 22 perpendicularly to the surface of the disk 22. The protrusion height H1 (FIG. 5) of the protrusion 22a can be determined in advance and stored. By doing so, the FOD control by the controller 42 is available.

The protrusion 22a can be formed on the surface of the disk 22 in a laser process. That is, when a laser is emitted to the surface of the disk 22, the surface of the disk 22 is indented by the laser so that a bump can be formed on the surface of the disk 22. The bump is used as the protrusion 22a.

Another method is lithography that is also used as a semiconductor manufacturing method. That is, a photosensitive material is coated on the surface of the disk 22 and exposed to light by arranging a mask above the disk 22. Next, developing and etching processes are carried out to form a pad having a desired height at a desired position. The pad is used as the protrusion 22a.

Figure 4:
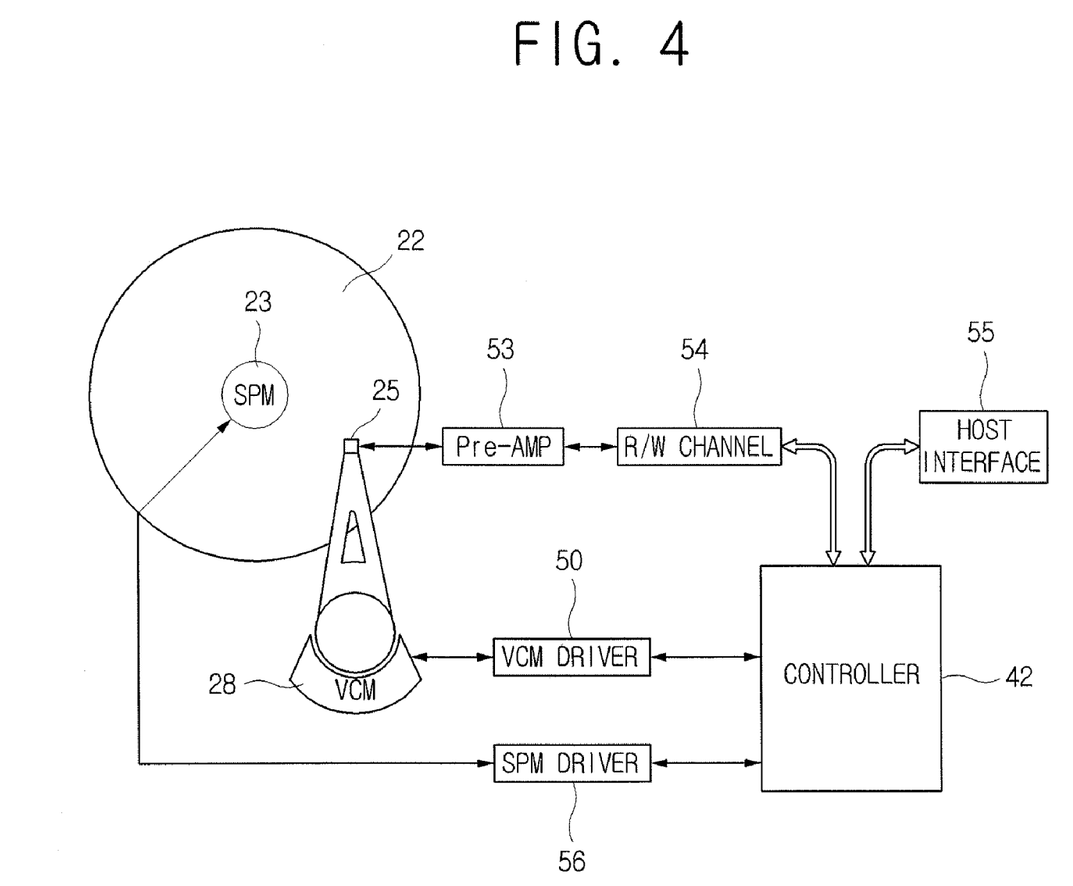
FIG. 4 is a block diagram illustrating a drive circuit of an HDD using a method to control an FOD of an HDD using a TA signal according to an embodiment of the present general inventive concept.

FIG. 4 is a block diagram illustrating a drive circuit of an HDD using a method to control an FOD of an HDD using a TA signal according to an embodiment of the present general inventive concept. Referring to FIG. 4, the hard disk drive apparatus 10 according to the present embodiment includes a pre-amplifier (Pre-AMP) 53, a read/write channel 54, a host interface 55, a VCM driver 50, an SPM driver 56, and a controller 42 controlling the above parts.

The pre-amplifier 53 amplifies a data signal reproduced by the magnetic head 25 from the disk 22 or write current converted by the read/write channel 54 and writes the amplified signal or current to the disk 22 through the magnetic head 25. The read/write (R/W) channel 54 converts the signal amplified by the pre-amplifier 53 to a digital signal and transmits the converted signal to a host device (not illustrated) through the host interface 55, or receives data input by a user through the host interface 55, converts the received data to a binary data stream that is easy to write, and inputs the converted stream to the pre-amplifier 53.

The host interface 55 transmits the converted digital data to the host device, or receives the data input by the user from the host device and inputs the received data to the read/write channel 54. The VCM driver 50 receives a control signal of the controller 42 and controls the amount of current applied to the VCM 28. The SPM driver 56 receives a control signal of the controller 42 and controls an amount of current applied to the spindle motor 23.

The controller 42 included in the hard disk drive apparatus 10 according to the present embodiment controls the FOD control method to maintain the FH of the magnetic head 25 with respect to the disk 22 constant as in the present embodiment. Also, the controller 42 controls reproduction of data from the disk 22 or writing of data to the disk 22, the voice coil motor 28 to move the magnetic head 25 to a desired position on the disk 22, or the spindle motor 23 to adjust a rotation speed of the disk 22. Detailed descriptions thereof will be omitted herein.

Additionally, the controller 42 moves the magnetic head 25 to the position of the protrusion 22a, applies an FOD voltage for a test to the magnetic head 25, and detects a TA signal generated when the magnetic head 25 touches (TD) the protrusion 22a by the FOD voltage for a test. Then, the controller 42 determines a maximum FOD voltage that is the maximum FOD voltage applied to the magnetic head 25 based on the detected TA signal and an FOD voltage to control the FH of the magnetic head 25 based on the maximum FOD voltage.

The protrusion 22a can be formed in the remaining area except for the user data zone (FIG. 3) as described above. Otherwise, only one protrusion can be formed. However, as in another embodiment illustrated in FIG. 7, two protrusions, that is, first and second protrusions 22a and 22b, are provided by further forming the second protrusion 22b in addition to the first protrusion 22a on the surface of the disk 22. The FOD voltage to control the FH of the magnetic head 25 can be determined based on the first and second protrusions 22a and 22b. An embodiment in which the first and second protrusions 22a and 22b are provided and the first protrusion 22a has the minimum height will be described below.

Figure 7:
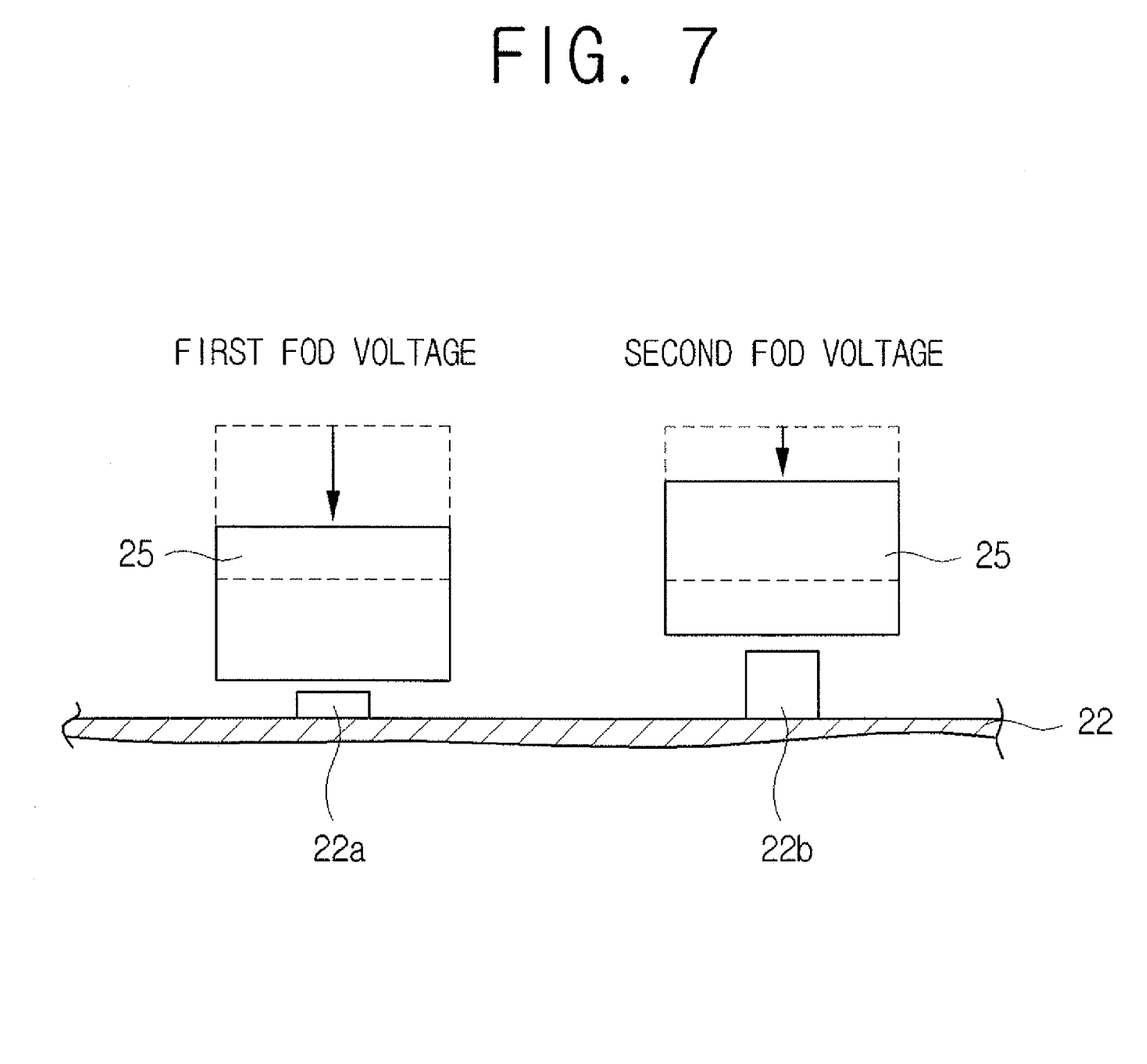
FIG. 7 illustrates two protrusions formed on a disk proximate to a magnetic head in which two FOD voltages are identified according to an embodiment of the present general inventive concept.

The controller 42 uses an FOD voltage applied when the pole tip of the magnetic head 25 touches the first protrusion 22a as a first FOD voltage to control the FH of the magnetic head 25. Since the first protrusion 22a has the minimum height, the FOD voltage can be regarded as the maximum FOD voltage with respect to the magnetic head 25. That is, even when the pole tip of the magnetic head 25 touches the first protrusion 22a, since the pole tip does not substantially touch the surface of the disk 22, the first FOD voltage can be used as the maximum FOD voltage.

The controller 42 uses an FOD voltage applied when the pole tip of the magnetic head 25 touches the second protrusion 22b that is higher than the first protrusion 22a, as a second FOD voltage to control the FH of the magnetic head 25. The FOD voltage to control the FH of the magnetic head 25 is finally determined based on a relationship between the obtained first and second FOD voltages. The relationship can be obtained by a function using two points that are already known.

Figure 6:
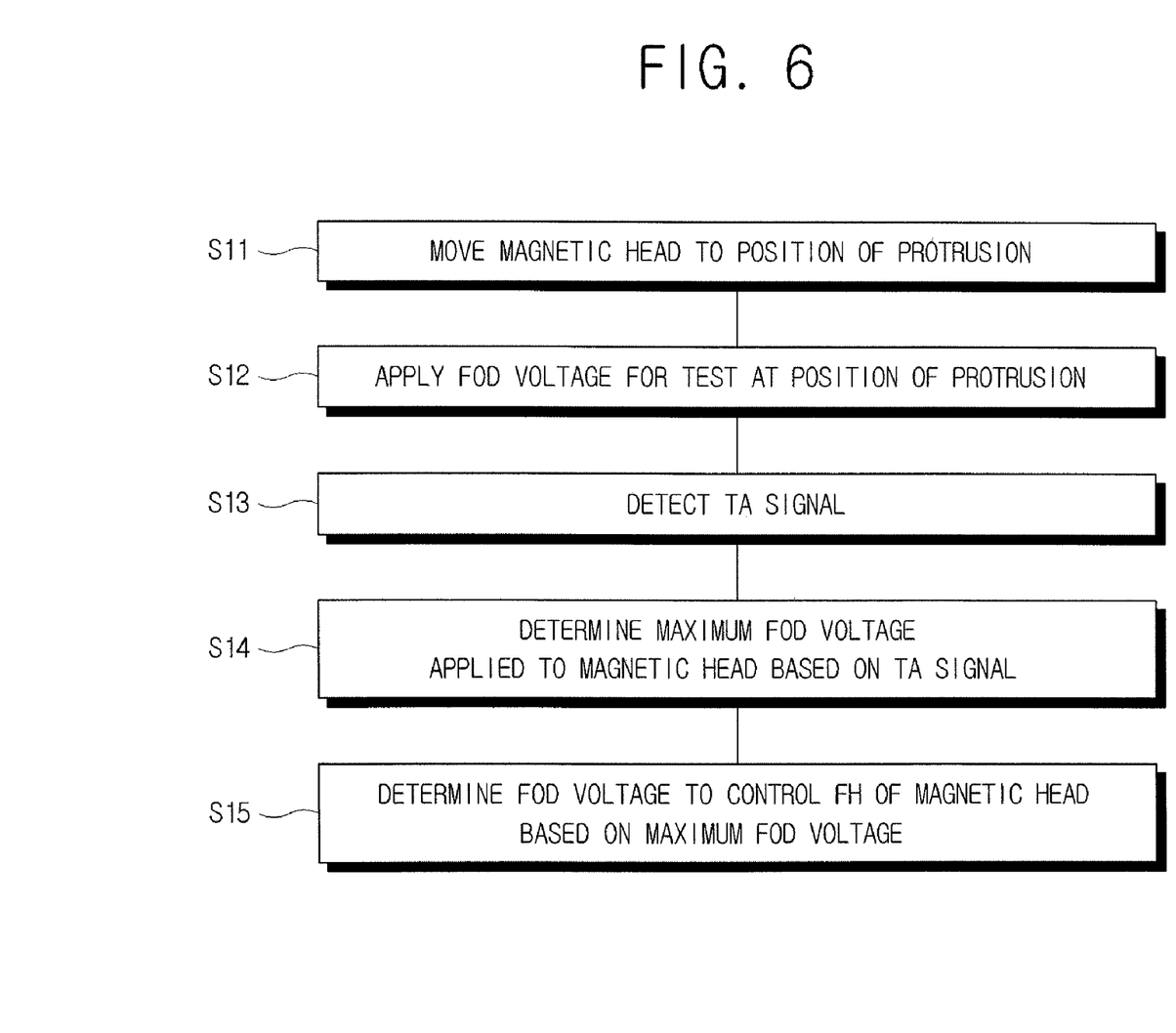
FIG. 6 is a flow chart illustrating a method to control an FOD of an HDD using a TA signal according to another embodiment of the present general inventive concept.

A method of controlling the FOD of a hard disk drive apparatus using a TA signal having the above structure is described with reference to FIGS. 5 and 6. FIG. 5 illustrates a magnetic head 25 proximate to a protrusion 22a on a disk 22. FIG. 6 is a flow chart illustrating a method to control an FOD of an HDD using a TA according to an embodiment of the present general inventive concept. The following description is for an embodiment in which a single protrusion is formed on the disk.

The controller 42 controls the HSA 24 (FIG. 2) and moves the magnetic head 25 to a position of the protrusion 22a provided on the disk 22 (operation S11). An FOD voltage for a test is increasingly applied at the position of the protrusion 22a (operation S12). For example, the FOD voltage for a test is applied to the magnetic head 25 in a frequency method by gradually increasing the voltage from 7 V to 8V and 9V, for example.

A TA signal generated when the pole tip of the magnetic head 25 thermally expands due to the applied FOD voltage for a test is detected (operation S13). When the TA signal is detected, the maximum FOD voltage that is the maximum FOD voltage applied to the magnetic head 25 is determined based on the TA signal (operation S14). The FOD voltage to control the FH of the magnetic head 25 is determined based on the maximum FOD voltage (operation S15).

When one more protrusions is further provided totaling two protrusions, that is, the first and second protrusions 22a and 22b, as illustrated in FIG. 7, as described above, the FOD voltage applied when the pole tip of the magnetic head 25 touches the first protrusion 22a is used as the first FOD voltage, that is, the maximum FOD voltage to control the FH of the magnetic head 25. The FOD voltage applied when the pole tip of the magnetic head 25 touches the second protrusion 22b is used as the second FOD voltage to control the FH of the magnetic head 25. The FOD voltage to control the FH of the magnetic head 25 is determined based on a relationship between the obtained first and second FOD voltages. In the same manner, three or more protrusions can be provided to control the FOD.

When the FOD control method to produce an FOD voltage in the above method is used, the FH of the magnetic head 25 with respect to the disk 22 can be actively controlled. Thus, the reliability of the read/write operation is improved and the performance of the hard disk drive 10 is improved. In particular, a general problem such as the HDI generated as a uniform FOD voltage is applied to the magnetic head as in the conventional technology can be solved.

The present general inventive concept can also be embodied as computer-readable codes on a computer-readable recording medium. The computer-readable medium can include a computer-readable recording medium and a computer-readable transmission medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network coupled computer systems so that the computer readable code is stored and executed in a distributed fashion. The computer-readable transmission medium can transmit carrier waves or signals (e.g., wired or wireless data transmission through the Internet). Also, functional programs, codes, and code segments to accomplish the present general inventive concept can be easily construed by programmers skilled in the art to which the present general inventive concept pertains.

Although various embodiments of the present general inventive concept have been illustrated and described, the present general inventive concept is not limited to the described embodiments. Instead, it would be appreciated by those skilled in the art that changes may be made to these embodiments without departing from the principles and spirit of the general inventive concept, the scope of which is defined by the claims and their equivalents.

According to the above-described embodiments of the present general inventive concept, the FH of the magnetic head with respect to the disk can be actively controlled so that reliability of a read/write operation is improved and general problems such as an HDI caused as a uniform FOD voltage is applied to the magnetic head as in the prior art is solved.

What is claimed is:

1. A method to control an FOD (flying on demand) voltage of a hard disk drive apparatus using a TA (thermal asperity) signal, the method comprising:
    providing at least one protrusion having a predetermined height on a disk, moving a magnetic head to a position of the protrusion, and applying an FOD voltage for a test to the magnetic head;
    detecting the TA signal generated when the magnetic head touches the protrusion by the applied FOD voltage for a test; and
    determining the maximum FOD voltage applied to the magnetic head based on the detected TA signal and determining an FOD voltage to control the FH (flying height) of the magnetic head based on the maximum FOD voltage.

2. The method of claim 1, wherein the at least one protrusion comprises;
    one protrusion and the height of the protrusion is lower than the FH of the magnetic head with respect to the disk when the FOD voltage for a test is not applied.

3. The method of claim 1, wherein the at least one protrusion comprises:
    two protrusions having predetermined different heights at different positions on a surface of the disk.

4. The method of claim 3, wherein, in the determining of the maximum FOD voltage applied to the magnetic head based on the detected TA signal and the determining of an FOD voltage to control the FH (flying height) of the magnetic head based on the maximum FOD voltage, an FOD voltage applied when the magnetic head touches a first protrusion having a lower height of the two protrusions is used as a first FOD voltage that corresponds to the maximum FOD voltage to control the FH of the magnetic head, and an FOD voltage applied when the magnetic head touches a second protrusion is used as a second FOD voltage to control the FH of the magnetic head, and an FOD voltage to control the FH of the magnetic head is determined based on a relationship between the first and second FOD voltages.

5. The method of claim 1, wherein the at least one protrusion is provided at a remaining area except for a data zone on the surface of the disk.

6. The method of claim 5, wherein the at least one protrusion comprises:
    a bump protruding from the surface of the disk by a laser process.

7. The method of claim 6, wherein the at least one protrusion comprises:
    a pad formed on the surface of the disk in a lithography method.

8. A computer-readable recording medium having embodied thereon a computer program to execute a method, wherein the method comprises:
    providing at least one protrusion having a predetermined height on a disk, moving a magnetic head to a position of the protrusion, and applying an FOD voltage for a test to the magnetic head;
    detecting a thermal asperity (TA) signal generated when the magnetic head touches the protrusion by the applied FOD voltage for a test; and
    determining the maximum FOD voltage applied to the magnetic head based on the detected TA signal and determining an FOD voltage to control the FH (flying height) of the magnetic head based on the maximum FOD voltage.

9. A hard disk drive apparatus, comprising:
    a disk on which at least one protrusion having a predetermined height is provided on a surface thereof;
    a magnetic head to record data on the disk or to reproduce the recorded data;
    a controller to control moving the magnetic head to a position of the protrusion, to apply an FOD (flying on demand) voltage for a test to the magnetic head, to detect a TA (thermal asperity) signal generated when the magnetic head touches the protrusion by the applied FOD voltage for a test, to determine a maximum FOD voltage applied to the magnetic head based on the detected TA signal, and to determine an FOD voltage to control the FH (flying height) of the magnetic head based on the maximum FOD voltage.

10. The hard disk drive apparatus of claim 9, wherein the at least one protrusion comprises:
    one protrusion and the height of the protrusion is lower than the FH of the magnetic head with respect to the disk when the FOD voltage for a test is not applied.

11. The hard disk drive apparatus of claim 9, wherein the at least one protrusion comprises:
    two protrusions having predetermined different heights at different positions on the surface of the disk.

12. The hard disk drive apparatus of claim 11, wherein an FOD voltage applied when the magnetic head touches a first protrusion having a lower height of the two protrusions is used as a first FOD voltage that corresponds to the maximum FOD voltage to control the FH of the magnetic head, and an FOD voltage applied when the magnetic head touches a second protrusion is used as a second FOD voltage to control the FH of the magnetic head, and an FOD voltage to control the FH of the magnetic head is determined based on a relationship between the first and second FOD voltages.

13. The hard disk drive apparatus of claim 9, wherein the at least one protrusion is provided at a remaining area except for a data zone on the surface of the disk.

14. The hard disk drive apparatus of claim 13, wherein the at least one protrusion comprises:
    a bump protruding from the surface of the disk by a laser process.

15. The hard disk drive of claim 13, wherein the at least one protrusion comprises:
    a pad formed on the surface of the disk in a lithography method.

16. A hard disk drive apparatus, comprising:
    one or more disks;
    a magnetic head to record data to or reproduce data from the one or more disks; and
    a controller to actively control a flying height of the magnetic head with respect to a respective disk to increase reliability of at least one of a read operation and a write operation based on a thermal asperity (TA) signal:
    wherein the controller controls the flying height of the magnetic head based on the thermal asperity signal by moving the magnetic head to a position of the respective disk and applying an FOD voltage for a test to the magnetic head detecting the TA signal generated when the magnetic head contacts the respective disk by the applied FOD voltage, determining the maximum FOD voltage applied to the magnetic head based on the detected TA signal and determining an FOD voltage to control the FH (flying height) of the magnetic head based on the maximum FOD voltage.

17. The apparatus of claim 16, wherein the respective disk comprises:
    a plurality of protrusions in which the FOD voltage can be determined based on the plurality of protrusions.

* * * * *